(12) United States Patent
Dörenberg

(10) Patent No.: US 10,155,604 B2
(45) Date of Patent: Dec. 18, 2018

(54) PACKAGING INSTALLATION AND METHOD FOR OPERATING A PACKAGING INSTALLATION

(71) Applicant: SIG Technology AG, Neuhausen am Rheinfall (CH)

(72) Inventor: Udo Dörenberg, Kerpen (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 15/572,615

(22) PCT Filed: Jun. 6, 2016

(86) PCT No.: PCT/EP2016/062761
§ 371 (c)(1),
(2) Date: Nov. 8, 2017

(87) PCT Pub. No.: WO2017/001150
PCT Pub. Date: Jan. 5, 2017

(65) Prior Publication Data
US 2018/0134433 A1   May 17, 2018

(30) Foreign Application Priority Data
Jun. 29, 2015  (DE) .......... 10 2015 110 390

(51) Int. Cl.
*B65G 43/00* (2006.01)
*B65G 43/10* (2006.01)
(Continued)

(52) U.S. Cl.
CPC .............. *B65B 57/04* (2013.01); *B65B 35/24* (2013.01); *B65B 35/44* (2013.01); *B65B 43/52* (2013.01);
(Continued)

(58) Field of Classification Search
None
See application file for complete search history.

(56) References Cited

U.S. PATENT DOCUMENTS

| 6,523,328 | B1 | 2/2003 | De Cardenas et al. |
| 7,894,934 | B2 * | 2/2011 | Wallace ................. B65G 43/00 198/341.01 |
| 8,408,380 | B2 * | 4/2013 | Doane .................. B65G 47/506 198/460.1 |

FOREIGN PATENT DOCUMENTS

| EP | 2075660 A1 | 7/2009 |
| WO | 0119677 A2 | 3/2001 |

* cited by examiner

*Primary Examiner* — Kavel Singh
(74) *Attorney, Agent, or Firm* — The Webb Law Firm

(57) ABSTRACT

Packaging installation having at least two packaging devices. Each packaging device has an input belt and an output belt. The input belt supplies packagings and the output belt receives packagings which are processed by the packaging device, a conveyor belt arranged between the output belt of a first packaging device and the input belt of a second packaging device, and a central control unit. A constant throughput over the packaging installation is achieved as the central control unit establishes at least the actual speed of the input belts and output belts and the conveyor belt and the central control unit establishes at least the actual packing density of the input belts and output belts and the conveyor belt and the central control unit in accordance with the actual packing density and the actual speeds determines at least desired speeds for the input belts and the output belts and the conveyor belt.

15 Claims, 5 Drawing Sheets

(51) Int. Cl.
*B65G 43/08* (2006.01)
*B65B 57/04* (2006.01)
*B65B 35/24* (2006.01)
*B65B 35/44* (2006.01)
*B65B 43/52* (2006.01)
*B65B 61/20* (2006.01)
*B65G 47/31* (2006.01)

(52) U.S. Cl.
CPC ............ *B65B 61/205* (2013.01); *B65G 43/00* (2013.01); *B65G 47/31* (2013.01); *B65G 2201/0235* (2013.01); *B65G 2203/0291* (2013.01); *B65G 2203/044* (2013.01)

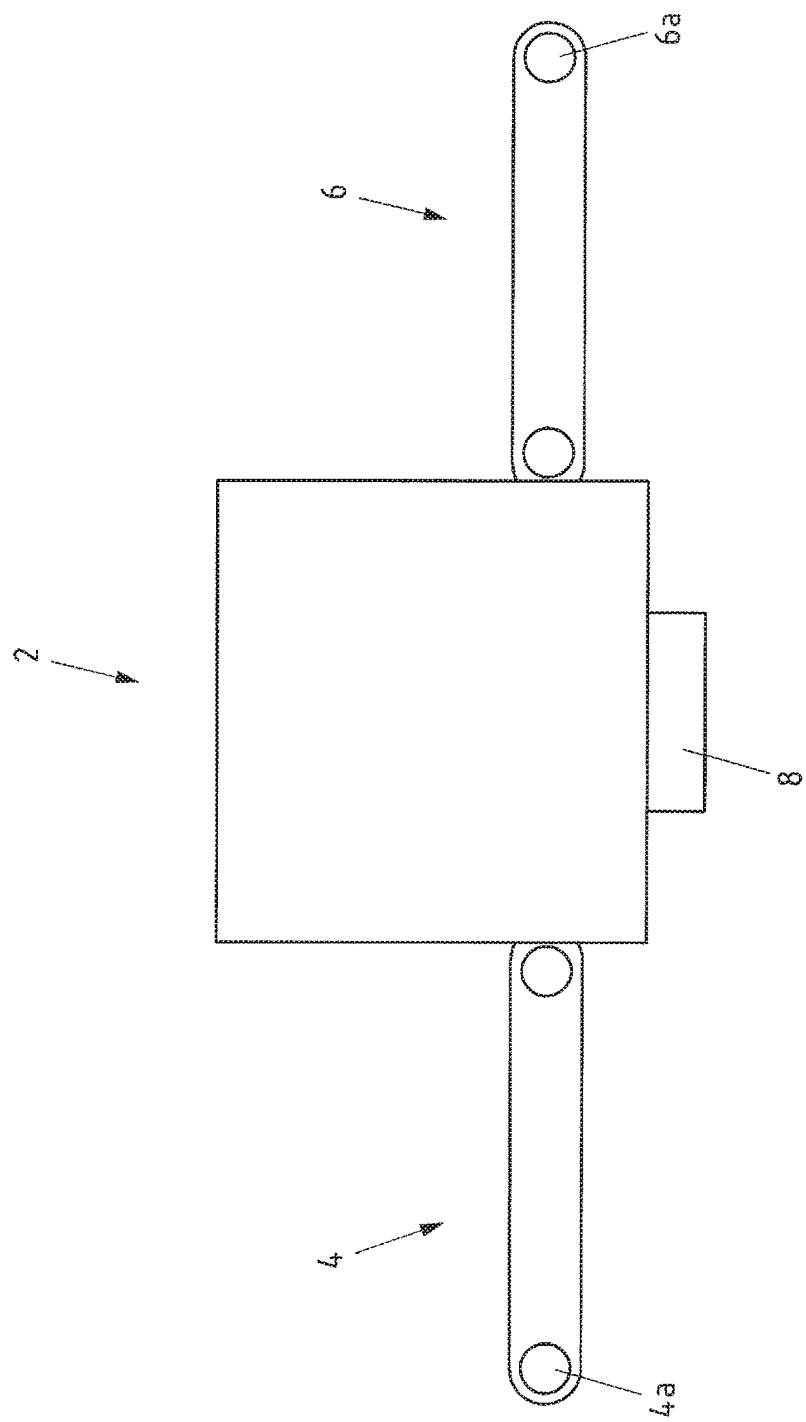

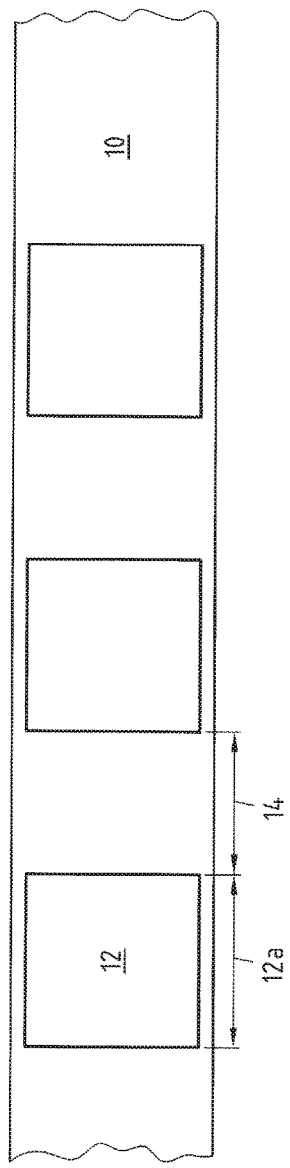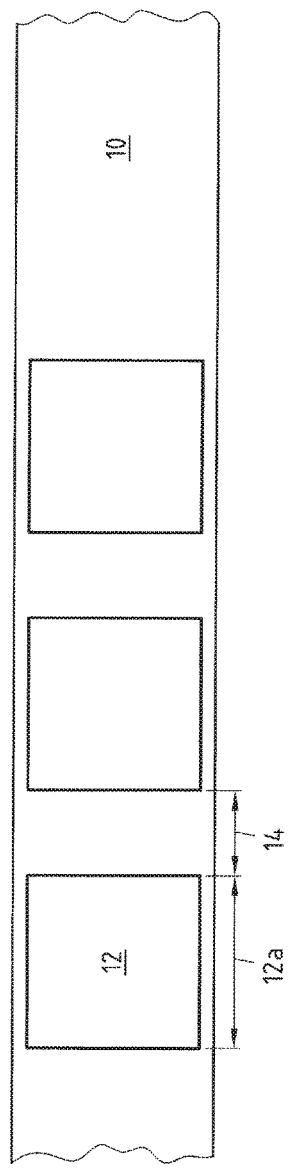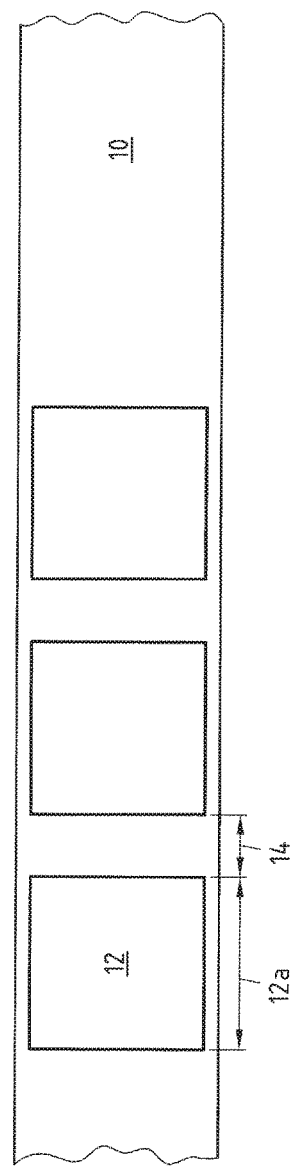

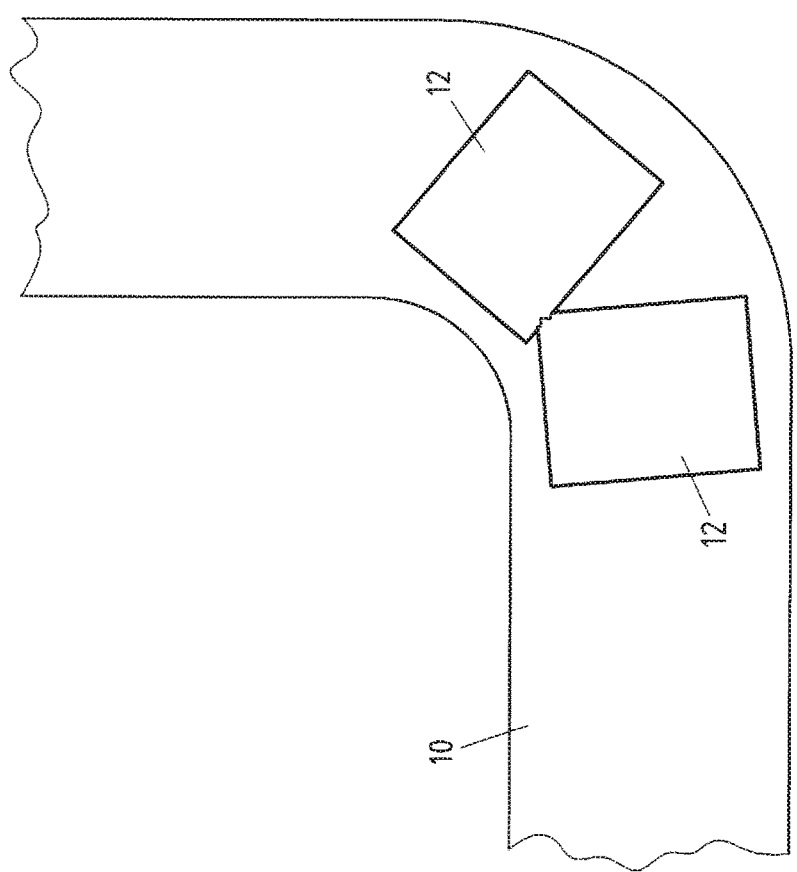

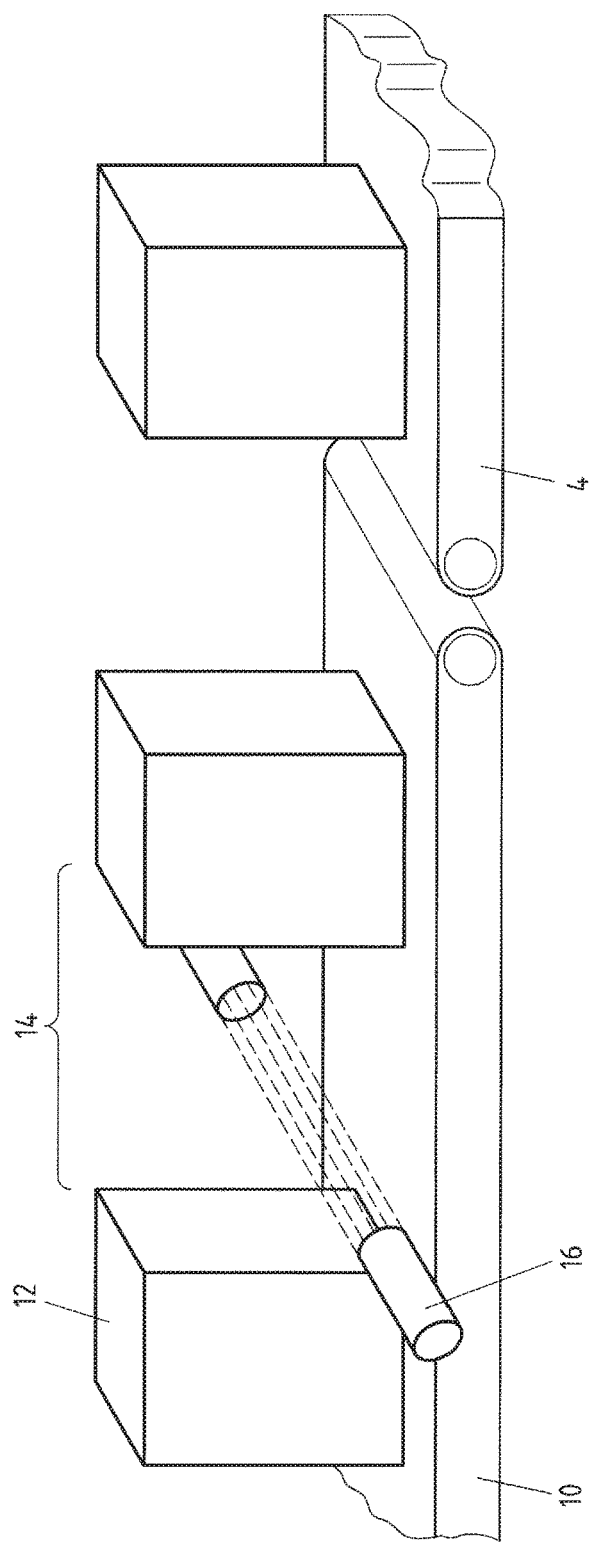

PACKAGING INSTALLATION AND METHOD FOR OPERATING A PACKAGING INSTALLATION

CROSS-REFERENCE TO RELATED APPLICATIONS

This application is the United States national phase of International Application No. PCT/EP2016/062761 filed Jun. 6, 2016, and claims priority to German Patent Application No. 10 2015 110 390.7 filed Jun. 29, 2015, the disclosures of which are hereby incorporated in their entirety by reference.

BACKGROUND OF THE INVENTION

Field of the Invention

The subject-matter relates to a packaging installation and a method for operating a packaging installation.

Description of Related Art

Packaging installations in the context of the subject-matter are operated in particular following the filling of packagings (also referred to below as packs for short). Filled packagings, in particular food packs, are processed in packaging installations, for example, applied with straws and packaged in larger bundles, for example, with four, six or eight packagings per bundle, and the like.

In this instance, the filled packagings are further processed in a great variety of processing units (also referred to as packaging devices). Each individual packaging device has in this instance a nominal output and a set output. The nominal output determines the number of packs which can be output by the packaging device per unit of time and can also be referred to as nominal capacity. The set output determines the actual number of packagings which are output per time unit and can also be referred to as current capacity. The number of packagings which a packaging device can receive per time unit can also be referred to as an intake capacity. This is generally identical to the set output, in particular when in the packaging device, which constitutes the rule, the number of packagings introduced is equal to the number of packagings output.

In a packaging installation, there is provided one after the other (downstream) a variety of packaging devices which have in particular different nominal outputs and set outputs. Consequently, the intake capacity of the different packaging devices is also generally different. Before and after each individual packaging device, there is provided a belt which is in particular part of the respective packaging device. At the input of the packaging device, an input belt is provided and, at the output of the packaging device, an output belt is provided.

Since the packaging devices are arranged sequentially one behind the other, uninterrupted operation is required in order to prevent packagings from backing up on the belts.

Conventionally, a blockage at the input of a packaging device is prevented by there being provided in the region of the input belt a clamping device or stopper which prevents further transport of the packagings to the input of the packaging device. Subsequent packagings run into the packaging which has been stopped by the stopper and form a blockage.

In conventional installations, the packagings run with undefined spacings with respect to each other, in particular the packagings may contact each other on the belts, in particular in the event of a blockage. This may be particularly problematic with soft packagings since these can become damaged in the event of mutual contact. In particular on bends of the conveyor belts, edges of the packagings may be pressed against edges of adjacent packagings, which may damage the adjacent packagings.

For this reason, an object of the subject-matter was to provide a packaging device which enables protective packing of filled packagings.

SUMMARY OF THE INVENTION

This object is achieved in terms of the subject-matter by a packaging installation and a method as described herein.

A packaging installation forming the subject-matter in particular has the packaging devices mentioned in the introduction. Each of these packaging devices preferably has an input belt and an output belt.

Furthermore, it is objectively proposed that there be provided between an output belt and an input belt a conveyor belt which can be operated independently of the input belt and the output belt. When belts are mentioned below, this may be intended to refer in each case to at least one of the input belts, output belts or conveyor belts.

The packaging installation forming the subject-matter has at least two packaging devices. These may in particular be a so-called "Straw Applicator" and a so-called "Traypacker". These and other packaging devices may be provided along the packaging installation sequentially one after the other. The packagings pass through the respective packaging devices one after the other (downstream).

Within a packaging installation forming the subject-matter, there may first be provided on the output belt of a filling machine, from which the filled packagings are discharged, at least one so-called "buffer table". The filled packagings are introduced from the filling machine into the buffer table and can be output from the buffer table with a set output which may be different from the output of the filling machine.

Each belt may be provided with a maximum number of packagings when a maximum packing density is reached. A maximum packing density may be defined individually for the installation. The packing density is preferably determined by the length of the packagings plus a defined spacing between two packagings. Based, for example, on a meter, a measurement for a packing density is produced. There may be provision objectively for a minimum spacing to be provided between two packagings. Consequently, for each packaging, at least the individual length plus the minimum spacing may be assumed. The length of the belt divided by this measurement of the packaging length gives the maximum number of packagings on the belt.

The packing density is intended to be understood to refer to the number of packagings per unit of length. This is produced from the number of packagings on the belt divided by the belt length.

The packing density is also produced from the introduction of packagings per time unit divided by the belt speed. The output of a belt and a packaging device may be produced from the number of packagings received per time unit. An intake capacity of a belt may be produced from the difference of the maximum speed of the belt and the actual speed of the belt multiplied by the difference of the maximum packing density and the actual packing density. This measurement can indicate how many more packagings a belt can receive per time unit. An output capacity of a belt can be determined from the actual packing density in packagings per lengths and the speed of the belt.

In objective terms, the installation is preferably operated by means of a central control unit in such a manner that the throughflow of packagings per time unit is preferably constant over all the packaging devices and belts.

The packaging installation forming the subject-matter preferably has at least two packaging devices. An input belt and an output belt are preferably associated with each of these packaging devices. The input belt and output belt may consequently be integral components of the respective packaging device. Consequently, the input belt and output belt may each be operated by the associated packaging device.

Between two packaging devices there is objectively provided a preferably independently operated conveyor belt. The conveyor belt preferably receives packagings from the output belt of a first packaging device and transports these packagings to the input belt of a second packaging device.

In order now to prevent packagings from becoming blocked inside the packaging installation, a central control unit is provided in objective terms. It has been objectively recognised that in the path of the packaging installation, that is to say, downstream of the path of the packagings, malfunctions may occur or outputs of individual components downstream may be lower than outputs of upstream components, which would inevitably lead to a blockage. Malfunctions or output differences (for example, as a result of temporary reduced output levels) may lead to occurrences of blockages upstream thereof. In order to prevent such blockages and at the same time to ensure that the packagings to the greatest possible extent do not fall below a minimum spacing with respect to each other, the central control unit monitors at least the actual speeds of the input belts and the output belts and the conveyor belt.

To this end, it is possible for the control unit to be connected to the respective belts by means of a communication network, in particular a parallel and/or serial communication bus. In particular, speed sensors may be provided on the belts. It is also possible for the speed of the belts to be detected directly at the drive motors of the belts. The detected speed of the belts may be communicated to the central control unit so that the actual speeds of the belts of the packaging installation are established in the control unit.

It has further been recognised that there should be central information relating to the state of a packing density of the individual belts. This information is relevant in order to know whether downstream of a specific packaging device there is still intake capacity so that the set output of a packaging device can be increased where applicable by the output of the downstream components also being increased.

The actual packing density can be detected by the central control unit by means of sensors which are arranged on the belts. Using the sensors, it is possible to detect how many packagings pass the sensor per time unit. With the knowledge of the speed of a belt, it is possible to calculate therefrom the number of packagings per unit of length and from this the actual packing density can be derived in the control unit.

In order to ensure a uniform throughflow of packagings along the packaging installation downstream, it is proposed that the central control unit determines in accordance with the actual packing density and the actual speeds at least desired speeds for the input belts and output belts of the packaging devices and the conveyor belt. With these desired values, the motors of the belts are supplied with power and the belts are operated accordingly. As a result of the central control unit, it is possible to detect and control the overall throughflow of packs in the packaging installation in a centralised manner. If increased packing densities which are close to the maximum packing density occur downstream, the speed of the belts can be reduced upstream where applicable in order to reduce pressure downstream.

In this instance, for each packaging device, as will be further described below, the set output can also be varied, in this instance, reduced, so that in addition to the transport of the packagings, the set output can also be changed, which leads to a variation of the throughflow through a packaging device.

In particular during the start-up of a packaging installation, that is to say, when the packaging devices of the packaging installation are initiated, it should be ensured that, when a packaging device is started, it does not have to be shut down or throttled immediately afterwards. This is ensured by the central control unit monitoring for each packaging device whether the packagings output by the respective packaging device can also be processed downstream. Only when the central control unit determines that a packaging device can process the packagings downstream without any build-up, that is to say, without exceeding the maximum packing density or without falling below the minimum packaging spacing, can the packaging device be started. Naturally, the same also applies to the belts which are located downstream and which must also have the required capacity.

In order to be able to control the throughflow through the entire packaging installation in the control unit, it is proposed that at least one maximum speed for the respective belts be parameterised in the control unit. It is thereby known in the control unit how high a speed of each individual belt may be. The desired speed should then not be adjusted above the maximum speed. The maximum capacity of a belt can also be calculated in the central control unit from the maximum speed and the maximum packing density.

Furthermore, in the control unit, at least a length of the belts can be parameterised. Depending on the length of the belts, it is possible to determine how large the intake capacity of each belt is. With the knowledge of the defined packaging length, that is to say, the actual pack length plus the defined spacing between two packs, preferably half a pack length, it is possible to calculate how many packagings fit onto a respective belt.

It is also proposed that at least a maximum packing density for the belts be parameterised in the control unit in accordance with a packing size. In particular, a packing density may be dependent on a bundle size. An individual pack or a plurality of packs may be combined in a bundle. The spacing between two packagings or between two bundles may be parameterised with a minimum spacing which is preferably half a packaging or a bundle. If, in a bundle, there are, for example, six packagings and if the bundle length is, for example, 30 cm, taking into account a minimum spacing of 15 cm, a maximum packing density of six packs per 45 cm, that is to say, 13⅓ packs per meter, can be achieved.

In order to ensure that the actual speeds established by the control unit correspond to each other, it is proposed that the actual speed be established at a reference frequency which is the same for all the belts. That is to say, for example, that all the belts are operated at the same time at a reference frequency of, for example, 50 Hz and at this reference frequency the actual speed of the belts is established by means of the control unit. As a result of variation of the frequency, the actual speed can be changed and can be adapted to a desired speed, in particular in a linear relationship between frequency and speed.

As has already been explained above, the throughput through the packaging installation is also dependent on the set output of each individual packaging device. In order to be able to adjust the packaging devices, it is proposed that the control unit determines a set output for a packaging device in each case. This determination of the set output is preferably adjusted in accordance with the belts and/or packaging devices arranged downstream of a packaging device. In particular, the set output is at a maximum as large as the smallest intake capacity of a packaging device downstream of the adjusted packaging device. Furthermore, the capacity of each belt can be determined by the maximum packing density being multiplied by the maximum speed of a belt and it can consequently be determined how many packs a belt can receive per time unit. The belt with the lowest capacity may be limiting for the set output of a packaging device which is arranged upstream. The control unit monitors the respective capacities and adjusts the set output of a respective packaging device accordingly.

As already mentioned, in the control unit, an intake capacity of a belt can be determined from a maximum packing density and a maximum speed of the belt. In the example mentioned above, the maximum packing density is 13⅓ packagings per meter. At a speed of 5 m per second, an intake capacity of 66⅔ packs per second is achieved. The intake capacity can be determined for each belt. However, the intake capacity is in particular determined for the conveyor belts. The input belt and output belt are preferably sized in such a manner that they can at least cover the nominal output of the associated packaging device, that is to say, they have a capacity in accordance with the nominal output.

According to an embodiment, it is proposed that the control unit establish an intake capacity of a belt. The intake capacity may be understood to be the value of how many more packagings per time unit can be received than was previously the case. To this end, it is, for example, possible to multiply the difference between the maximum speed and the actual speed by the difference resulting from the maximum packing density and the actual packing density. If it is known how many more packagings a belt can receive per second, and if this is calculated for all belts downstream, a set output of a packaging device can be increased where applicable. This requires that the downstream packaging devices in each case also have a higher nominal output than their set output in order to also increase the capacity thereof.

The determination of the possible increase of the throughput of all the belts and packaging devices downstream of a packaging device prevents a packaging device from being acted on with an increased set output which leads to a blockage downstream. When the packaging devices are started up, it is consequently ensured that, when the packaging device starts, the packagings output by the packaging device can be processed downstream. Furthermore, after the packaging device has been started, the set output thereof is prevented from having to be throttled because a blockage has occurred downstream. This is only necessary in the event of a malfunction since it is generally known beforehand how high the maximum set output of a respective packaging device can be since the nominal output of the downstream packaging devices and the maximum capacities of the downstream belts are known in the central control station. As a result of the central control unit, flawless operation of a packaging installation with a plurality of packaging devices is consequently ensured.

According to an embodiment, it is proposed that the control unit for a packaging device which is arranged upstream determines a set output in accordance with an intake capacity of at least one, preferably all of the downstream belts and an intake capacity of at least one, preferably all of the downstream packaging devices. In particular, the minimum intake capacity of all the downstream belts and the minimum intake capacity of all the downstream packaging devices is determined. The minimum value of this intake capacity determines the value of the set output for the packaging device which is set. It is thereby ensured that the packagings which are output by the packaging device can also always be taken and processed downstream without a blockage being produced, with at the same time the minimum spacing between two bundles or packagings being ensured.

As already mentioned in the introduction, a buffer table is provided in a packaging installation, preferably downstream of the filling machine. This buffer table can receive a large number of packagings from the filling machine without having to discharge them again immediately on the output belt thereof. Consequently, the buffer table may act as a buffer which first receives excessive packagings. A buffer table is preferably the first packaging device along a plurality of packaging devices of a packaging installation which are arranged one after the other downstream. A control unit of the respective packaging devices and belts is preferably carried out downstream of a buffer table, in particular the desired speed and/or the set output are determined downstream of a buffer table. The control unit preferably monitors packaging devices between two buffer tables respectively, where they are present, or between a buffer table and an end of the packaging installation.

In order to optimise the throughput of packagings through the packaging installation, it is proposed that the control unit constantly monitor the set output and the speed of the belts and adjust it in such a manner that to the greatest possible extent the maximum packing density is achieved at maximum speed of the belts. This is generally not possible when a packaging device is started since the number of the packagings output by a packaging device increases over time during the start-up. However, this increase of the number of packagings output must lead to the downstream belts and packaging devices having to increase their capacities before, but at the latest at the time when, the maximum packing density is reached. In order to improve the throughput, it is proposed that the control unit determine the set output and/or the desired speed in an iterative manner based in each case on a buffer table for the belts and/or processing devices which are arranged downstream.

In this instance, the adjustment can be determined in each case based on the belts and/or processing devices which are arranged downstream thereof. The iteration can be carried out continuously from the last belt or last processing device when viewed downstream as far as the first processing device or first belt when viewed downstream. It is detected upstream of the last processing device or the last belt how high the respective capacity is and/or whether there is still intake capacity. In accordance with the smallest detected capacity, the set output or the speed is then adjusted accordingly downstream of the first packaging device or the first belt. This monitoring is carried out in an iterative manner in each case over all the packaging devices and belts and, as long as a downstream belt or downstream packaging device has intake capacity, the capacity thereof can be increased, which leads to the packaging device or belts also being able to be increased upstream in terms of their respective capacities.

In order to prevent the packagings from accumulating in an upstream packaging device in the event of a malfunction of a belt which is arranged downstream or a processing device which is arranged downstream, it is proposed that an output belt have at least such a length that the output belt taking into account the maximum packing density can receive all the packagings which are located inside the packaging device in a packaging process. It is consequently ensured that each packaging device can emptied in the event of a malfunction, that is to say, all the currently processed packagings can run out of the packaging device onto the output belt.

In order to minimise the number of sensors, it is proposed that precisely one sensor which detects a packaging be arranged on a belt. In particular, the sensor is provided on an upstream belt in the region of a transfer location to an adjacent downstream belt.

According to an embodiment, it is proposed that the central control unit receive a request for packagings from a processing device, in particular that the request contain an indication of an intake capacity. The packaging device can consequently inform a central control unit when it still has intake capacity, in particular when the set output is lower than the nominal output. Depending on whether or not the packaging devices have intake capacity, the central control unit can adjust the belts and/or packaging devices which are arranged upstream of this packaging device in such a manner that the introduction of packagings to the packaging device is approximated to the stated intake capacity. Consequently, the capacity of all the upstream packaging devices and/or belts can be individually increased respectively in order to operate the downstream packaging device at the maximum capacity.

According to an embodiment, it is proposed that the central control unit detects the intake capacity of all the belts and/or packaging devices downstream of a buffer table. In accordance with this, the central control unit can approximate the set output of the buffer table to the minimum detected intake capacity and preferably not exceed it. Consequently, the output of the buffer table is adapted to the weakest link in the downstream chain of processing devices and belts.

According to an embodiment, it is proposed that the central control unit adjust the desired speeds of the belts and the set output of the processing device in such a manner that the throughput along the installation is constant. It is thereby ensured that the number of packagings which pass through the packaging installation per time unit is constant over all the packaging devices.

Another aspect is a method for operating such a packaging installation. In this instance, it is proposed that at least the actual speed of the input belts and the output belts of the packaging device and the conveyor belt be established. Furthermore, at least the actual packing density of the input belts and the output belts of the packaging device and the conveyor belt is established. In accordance with the actual packing densities and the actual speeds, at least desired speeds for the input belts and the output belts of the packaging devices and the conveyor belt are determined. This detection and determination is preferably carried out in a central control unit, which is connected to the packaging devices of the packaging installation and the belts or the motors and sensors on the belts.

BRIEF DESCRIPTION OF THE DRAWINGS

The subject-matter is explained in greater detail below with reference to drawings which show embodiments and in which:

FIG. 1 shows a packaging device,
FIGS. 2a-c are schematic views of packagings on a belt;
FIG. 3 is a schematic view of a belt with a bend;
FIG. 4 is a schematic view of a sensor on a conveyor belt.

FIG. 1 shows a packaging device 2. The packaging device 2 may represent a great variety of packaging functions. In particular, the packaging device 2 is one which is provided downstream following a filling machine. The packaging device 2 may, for example, be a "Straw applicator", a "Traypacker", a buffer table or the like. The packaging device 2 has an input belt 4 and an output belt 6. Both the input belt 4 and the output belt 6 are driven in each case by means of at least one motor 4a, 6a, in particular an electrical alternating-current motor. The packaging device 2 may be operated at a maximum power in accordance with a nominal output, for example, a number of packs per time unit. The actual capacity of a packaging device 2 can be determined by means of a set output which preferably corresponds to maximum nominal output and indicates how many packagings per time unit the packaging device 2 actually processes.

Figure 5:
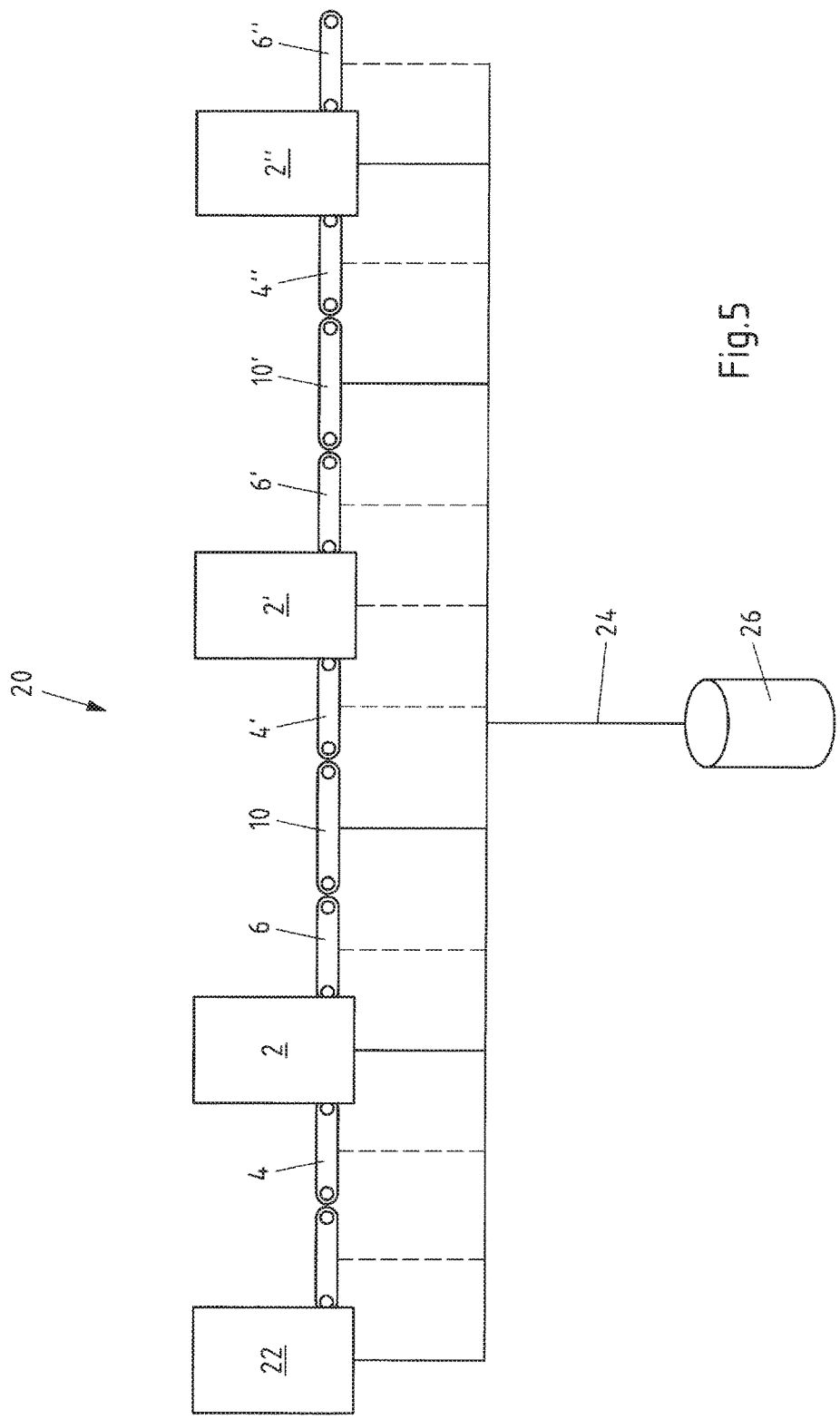
FIG. 5 is a schematic view of a packaging installation.

According to the set output of a packaging device 2, a supply of packagings can be carried out via the input belt 4.

A number of packagings may be arranged on the input belt 4. In this instance, a minimum spacing which preferably corresponds to at least half the length of a packaging between two packagings is intended to be complied with. The so-called packing density on the input belt 4, which preferably applies to all other belts, can indicate how many packs per unit of length are arranged or may be arranged on the input belt 4. If the packing density on a belt is multiplied by the belt speed, the capacity of a belt, in particular the number of packagings which are output at the belt end per unit of time, is produced. Preferably, the capacity of the input belt 4 and of the output belt 6 corresponds to the set output of the packaging device 2.

According to the subject-matter, the packaging device 2 has a communication module 8. The communication module 8 may be provided integrally for the packaging device 2 or divided into individual communication modules which are each arranged on the packaging device 2, the input belt 4 and the output belt 6.

Via the communication module 8, the set data and operating data of the packaging device 2 can be transmitted to a central control unit. To this end, it is possible, for example, for the state of the packaging device 2 and the belts 4 and 6 to be input and output. Furthermore, it is possible to transmit, for example, the current set output of the packaging device 2 and the speed of the motors 4a, 6a and consequently the belt speed of the belts 4, 6. It is also possible to receive desired values, in particular for the set output and the speed of the belts 4 and 6. Via the communication module 8, a central control unit of the packaging device 2 and the input belt 4 and the output belt 6 is consequently possible.

A conveyor belt 10 may be provided between an input belt 4 and an output belt 6 of two adjacent packaging devices 2. Such a conveyor belt 10 is, for example, illustrated in FIGS. 2a-c. The illustrations naturally also apply accordingly to the belts 4, 6. FIGS. 2*a*-*c* show the conveyor belt 10 as a plan view with different packing densities. Packagings 12 are transported on the conveyor belt 10. A packaging 12 has a packaging length 12*a* which is the extent of the packaging 12 in the transport direction. Between the packagings 12 there is a spacing 14. This spacing 14 between packagings 12 is detected by means of sensors, as will be described below.

Whilst a belt 10 is operated, packagings 12 are conveyed on the belt 10 downstream in the transport direction. Depending on the number of packagings 12 which are brought to the belt 10 per unit of time and the speed of the belt 10, the spacing 14 is adjusted. In FIG. 2*a*, the spacing 14 is so large that it is much larger than half of the length 12*a*. In particular, the length of the packagings 12*a* can be decisive for the minimum spacing 14. It is possible to define a minimum spacing 14 which has to be maintained between two packagings 12. This minimum spacing 14 may, for example, be between the length 12*a* and half the length 12*a* of the packaging 12. Depending on the spacing 14, a packing density on the belt 10 is produced.

FIG. 2*b* shows the belt 10 with a maximum packing density. In this instance, the spacing 14 between two packagings 12 is in accordance with half the length 12*a*. In particular when the spacing 14 corresponds to this minimum spacing, the maximum packing density on the belt 10 is achieved. If the maximum speed of the belt 10 is also achieved, the belt 10 has no additional intake capacity and transports packagings 12 at maximum capacity. The number of packs which are transported by the belt 10 per unit of time is obtained from the speed of the belt 10 multiplied by the packing density.

FIG. 2*c* shows another example but in which the packs 12 are transported too closely to each other. It can be seen that the spacing 14 is smaller, for example, than half the pack length 12*a*. In this instance, the packagings 12 which are preferably soft packagings may become damaged. Possible damage may occur in the event of blockages since the packagings strike each other on the side faces thereof in the movement direction and consequently, for example, impressions may become smeared.

It is also possible that damage may occur when the packagings 12 are transported around a bend along a belt 10, as illustrated in FIG. 3. If the spacing 14 is too small, as illustrated in FIG. 3, a side edge of a packaging 12 may be pressed into a side face of a previous packaging 12, which may lead to damage to the previous packaging 12. Damage to the packagings 12 is intended to be avoided to the greatest possible extent.

In order now to be able to detect on a belt 10 and where applicable on one of the belts 4 or 6 a spacing between the packagings 12, sensors 16 are preferably provided at the ends of the respective belts 6, 10. The sensors 16 are, for example, proximity sensors or light-sensitive sensors, such as, for example, photoelectric barriers. Using the sensors 16, it is possible to establish the time which elapses before a subsequent packaging 12 follows a previous packaging 12. If the speed of the belt 10 is known, the spacing 14 of the packagings 12 with respect to each other can be calculated therefrom.

The sensors 16 can transmit their measurement values to the central control unit independently or via the communication module 8. It is also possible for there to be provided within the sensors 16 or on the belt 10 a calculating unit which together with the speed of the belt calculates the spacing of the packagings 12 and transmits this spacing information to the central control unit. Depending on the spacing measured, a processing device 2 can be adjusted with respect to its output and the belts 4, 6, 10 with respect to the speed.

FIG. 5 shows a packaging installation 20 with different packaging devices 2, 2', 2". It can be seen that an input belt 4 and an output belt 6 is associated with each packaging device 2. A conveyor belt 10, 10' is arranged between the input belt 4 and the output belt 6. Each packaging device 2-2" and the filling machine 22 and the conveyor belts 10, 10' are connected to a central control unit 26 by means of a communication bus 24. In particular information relating to the respective packing densities on the belts 4, 6, 10 and the speeds of the belts 4, 6, 10 and the set outputs of the packaging device 2 is entered into the central control unit 26.

The central control unit 26 manages the control of all the packaging devices 2 and all the belts 4, 6, 10 centrally and preferably controls them in such a manner that, downstream, that is to say, starting from the filling machine 22 (or a buffer table) as far as the last packaging device 2", the most constant possible throughflow of packagings is ensured. In particular, a blockage on one of the belts 4, 6, 10 is intended to be prevented and the minimum spacing between the packagings 12 on the belts 4, 6, 10 is intended to be maintained. In this instance, stoppers or other clamping devices are intended to be dispensed with.

In FIG. 5, the packaging device 2 is, for example, a buffer table. Preferably downstream of a buffer table 2, the adjustment for the belts 4, 6, 10 and the packaging device 2 and 2" is controlled by the central control unit 2. The filling machine 22 supplies packagings 12 which are filled and closed. These packagings 12 travel over the input belt 4 into the buffer table 2. Initially, the buffer table 2 temporarily stores the packagings 12. At the beginning, that is to say, when the packaging installation 20 starts up, the central control unit 26 first monitors whether packagings 12 can be received on the output belt 6".

Furthermore, the central control unit 26 monitors whether packagings 12 can be received on the conveyor belt 10. Subsequently, the central control unit 26 verifies the nominal output of the packaging device 2". Subsequently, the central control unit 26 verifies the nominal output of the packaging device 2' and the possibility of whether the belts 4' or 6' can receive packagings.

Furthermore, the central control unit 26 monitors whether the belt 10 can receive packagings and whether the belt 6 can receive packagings. If this is ensured, the packaging installation 20 or the packaging device 2, 2' and 2" can be operated. To this end, it is verified by the central control unit 26 which of the packaging devices 2', 2" or which of the belts 4, 6, 10 has the lowest capacity. That is to say, if packagings 12 are already present on a belt 4, 6, 10, the intake capacity thereof is verified. In addition, the lowest nominal output of the packaging device 2', 2" is established. The value of the lowest capacity of a belt or the lowest nominal output of a packaging device 2', 2" is used to instruct the buffer table 2 to output packagings onto the belt 6 with a specific output capacity.

Subsequently, the belts and the packaging devices 2', 2" start up and process the packagings output by the buffer table 2. During current operation, it is constantly monitored whether the set output of all the downstream packaging devices 2', 2" reach the nominal output or not. If not, there is still intake capacity so that where applicable the set output of these packaging devices 2', 2" could be increased. Furthermore, it is continuously monitored how high the packing density is on the respective belts 4, 6, 10 and how high the speed of the belts is. If the maximum packing density is not yet achieved and/or if the belts do not yet run at maximum speed, the belts may where applicable receive more packagings and consequently have intake capacity.

If it is determined that all the downstream devices have intake capacity or can be increased in terms of their set output, the buffer table 2 is instructed to output packs at a higher rate so that the rate of use and the packing density are increased over all the belts. This process is continuously carried out in an iterative manner so that for each packaging device 2, 2', 2" it is monitored whether the downstream packaging devices or belts still have intake capacity or are at the limit of their capacity. In the first instance, the intake capacities can be increased by increasing the set output and the speeds of the belts and consequently the throughput through the packaging installation 20 can be increased.

As a result of the central control unit 26, it is ensured that a throughflow of packagings is always ensured downstream over the entire packaging installation without blockages occurring or that a value does not fall below a minimum spacing between two packagings.

LIST OF REFERENCE NUMERALS

2 Packaging device
4 Input belt
6 Output belt
4a, 6a Motor
8 Communication module
10 Conveyor belt
12 Packaging
12a Length
14 Spacing
16 Sensor
20 Packaging installation
22 Filling machine
24 Communication bus
26 Central control unit

The invention claimed is:

1. A packaging installation comprising:
   at least two packaging devices arranged sequentially, wherein each packaging device has an input belt and an output belt, and the input belt of the packaging device supplies packagings and the output belt receives packagings which have been processed by the packaging devices,
   a conveyor belt which is arranged between the output belt of a first packaging device and the input belt of a second packaging device, and
   a central control unit,
   wherein
   the central control unit establishes at least the actual speed of the input belts and the output belts of the packaging devices and the conveyor belt, and
   the central control unit establishes at least the actual packing density of the input belts and the output belts of the packaging devices and the conveyor belt,
   the central control unit in accordance with the actual packing density and the actual speeds determines at least desired speeds for the input belts and the output belts of the packaging devices and the conveyor belt, such that the distance between packagings does not fall below a minimum length, and
   wherein the control unit determines an intake capacity of a belt from a maximum packing density and a maximum speed of the belt.

2. The packaging installation according to claim 1, wherein
   in the control unit at least one maximum speed for the input belts and/or the output belts and/or the conveyor belts is parameterised and/or
   in the control unit at least a length of the input belts, the output belts and/or the conveyor belts is parameterised and/or
   in the control unit at least a maximum packing density for the input belts and/or the output belts and/or the conveyor belts is parameterised in accordance with a packaging size, wherein in particular a minimum spacing between two packagings on one of the belts corresponds to half of the packaging length.

3. The packaging installation according to claim 1, wherein the control unit establishes the actual speed at a reference frequency which is the same for all the belts.

4. The packaging installation according to claim 1, wherein the control unit determines a set output for a packaging device, respectively.

5. The packaging installation according to claim 1, wherein the control unit determines an intake capacity of a belt from the actual packing density and the maximum packing density and the actual speed and the maximum speed of the belt.

6. The packaging installation according to claim 1, wherein the control unit determines a set output for a packaging device which is arranged upstream in accordance with an intake capacity of at least one, preferably all of the downstream belts, and an intake capacity of at least one, preferably all of the downstream packaging devices.

7. The packaging installation according to claim 1, wherein the control unit determines a desired speed for a belt which is arranged upstream in accordance with an intake capacity of at least one, preferably all of the downstream belts, and an intake capacity of at least one, preferably all of the downstream packaging devices.

8. The packaging installation according to claim 1, wherein the control unit determines the desired speeds and/or set outputs in each case for packaging devices and belts downstream of a buffer table.

9. The packaging installation according to claim 1, wherein the control unit determines the set output and/or the desired speed in an iterative manner based on a buffer table for the belts and/or packaging devices which are arranged downstream, based on the belts and/or packaging devices which are arranged downstream thereof.

10. The packaging installation according to claim 1, wherein an output belt has at least such a length that the output belt taking into account the maximum packing density can receive all of the packagings located inside the packaging device in a packaging.

11. The packaging installation according to claim 1, wherein in each case precisely one sensor which detects a packaging is arranged on a belt, in particular in a region of a transfer location to an adjacent belt.

12. The packaging installation according to claim 1, wherein the central control unit receives a request for packagings from a packaging device, in particular in that the request contains an indication of an intake capacity and in that the central control unit adjusts the belts and/or packaging devices which are arranged upstream of this packaging device in such a manner that the introduction of packagings to the packaging device is approximated to the stated intake capacity.

13. The packaging installation according to claim 1, wherein the central control unit detects intake capacities of all the belts and/or packaging devices downstream of a buffer table and in that the central control unit has approximated the set output of the buffer table to the minimum detected intake capacity but preferably does not exceed it.

14. The packaging installation according to claim 1, wherein the central control unit adjusts the desired speeds of the belts and the set outputs of the packaging devices in such a manner that the throughput along the packaging installations is constant.

15. A method for operating a packaging installation according to claim 1, comprising the steps of:
- establishing at least the actual speed of the input belts and the output belts of the packaging devices and the conveyor belt, and
- establishing at least the actual packing density of the input belts and the output belts of the packaging devices and the conveyor belt,
- determining in accordance with the actual packing density and the actual speeds at least desired speeds for the input belts and the output belts of the packaging devices and the conveyor belt, such that the distance between packagings does not fall below a minimum length, and
- determining an intake capacity of a belt from a maximum packing density and a maximum speed of the belt.

\* \* \* \* \*